June 11, 1968   J. C. HURLBURT   3,387,438
MOWER STABILIZER ARM

Filed Oct. 23, 1965   2 Sheets-Sheet 1

INVENTOR.
JOSEPH C. HURLBURT
BY Walter V. Wright
AGENT

June 11, 1968   J. C. HURLBURT   3,387,438
MOWER STABILIZER ARM
Filed Oct. 23, 1965   2 Sheets-Sheet 2
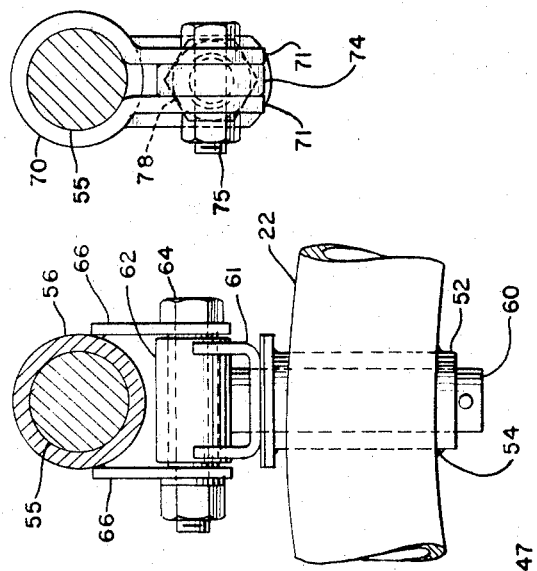
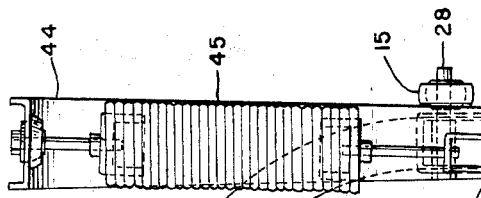
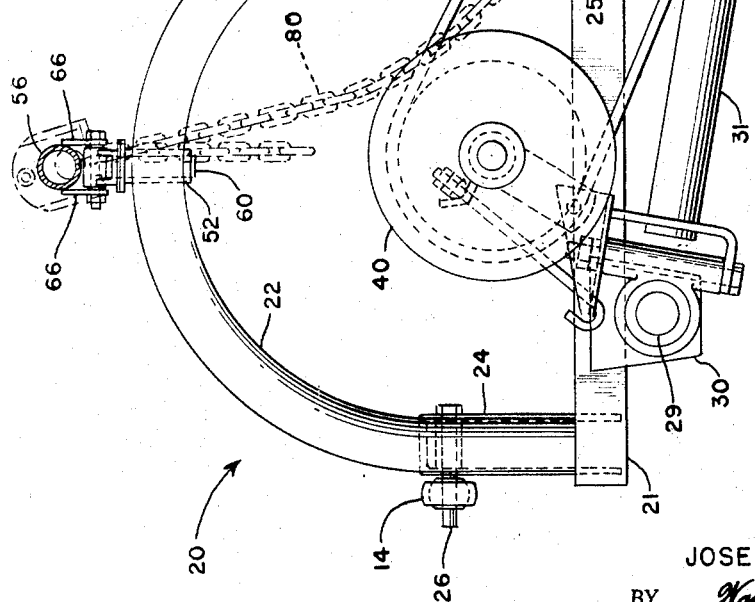
INVENTOR.
JOSEPH C. HURLBURT
BY Walter V. Wright
AGENT

United States Patent Office 3,387,438
Patented June 11, 1968

3,387,438
MOWER STABILIZER ARM
Joseph C. Hurlburt, Leola, Pa., assignor to Sperry Rand Corporation, New Holland, Pa., a corporation of Delaware
Filed Oct. 23, 1965, Ser. No. 503,176
4 Claims. (Cl. 56—25)

This invention relates, generally, to tractor mounted mowers of the three-point hitch type. More specifically, this invention relates to an improved multi-purpose stabilizer arm for a three-point hitch tractor mounted mower.

Tractor three-point hitch implement mounting systems are well known. They consist of a pair of laterally spaced vertically swingable lower links, or drawbars, extending rearwardly from the tractor chassis at opposite sides of the rear of the tractor body and an upper hitch member on the rear of the tractor body disposed between and above the drawbars. An implement such as a mower, is pivotally carried on the rearwardly projecting ends of the drawbars. An upper stabilizer arm is innerconnected between the implement and the tractor upper rear hitch member to steady the implement in the fore-and-aft direction then the drawbars are swung vertically by the tractor hydraulic system to raise and lower the implement.

A mower designed for three-point hitch tractor mounting has a base frame which is provided with laterally spaced hitch members disposed in positions suitable for connection to the drawbars of a three-point hitch mounting assembly. The base frame also has some form of upstanding mast which provides an upper hitch point between and above the laterally spaced hitch members. The stabilizer arm of the three-point hitch mounting assembly is innerconnected between the upper hitch point of the mower base frame and the upper rear hitch member of the tractor. A drag bar has one end pivotally carried by the mower base frame at the rear of the frame. The drag bar extends laterally relative to the direction of operating travel of the tractor. The mower cutter bar and its driving head are carried on the laterally projecting end of the drag bar. Mechanism is usually provided for pivoting the drag bar about its pivotally mounted end to a raised transport position in response to raising of the tractor drawbars. Other mechanism is usually provided for tilting the leading edge of the mower cutter bar upwardly or downwardly to accommodate different types of crop and field conditions.

The function of the conventional three-point hitch upper link, or stabilizer arm, is merely to prevent fore-and-aft tipping of the mower base frame about its pivotal mounting connection to the tractor drawbars.

It is an object of this invention to provide a three-point hitch upper stabilizer arm for a tractor mounted mower which, in addition to the usual mower stabilizing function, performs a direct and economical drag bar raising and lowering function.

It is another object of this invention to provide an upper stabilizer arm for a three-point hitch tractor mounted mower wherein the stabilizer arm is capable of precise fine adjustment for regulating the cutter bar tilt angle to accommodate different types of crop and field conditions.

It is another object of this invention to provide an upper stabilizer arm for use on a three-point hitch tractor mounted mower wherein the stabilizer arm affords quick, simple, coarse adjustment of its length to accommodate different types and sizes of tractors.

It is another object of this invention to provide a rugged, mechanically simple, three-point hitch mower stabilizer arm capable of manufacture at low cost and eliminating the need for separate drag bar lift mechanism and cutter bar tilt adjustment mechanism.

These and other objects and advantages of this invention will be apparent upon reference to the following description and claims taken in conjunction with the accompanying drawings wherein:

FIG. 2 is a rear elevational view of the mower and three-point hitch mounting linkage shown in FIG. 1;

FIG. 3 is an enlarged sectional view of the stabilizer arm of the present invention taken on the line 3—3 of FIG. 1; and FIG. 4 is a sectional view similar to FIG. 3 taken on the line 4—4 of FIG. 1.

Figure 1:
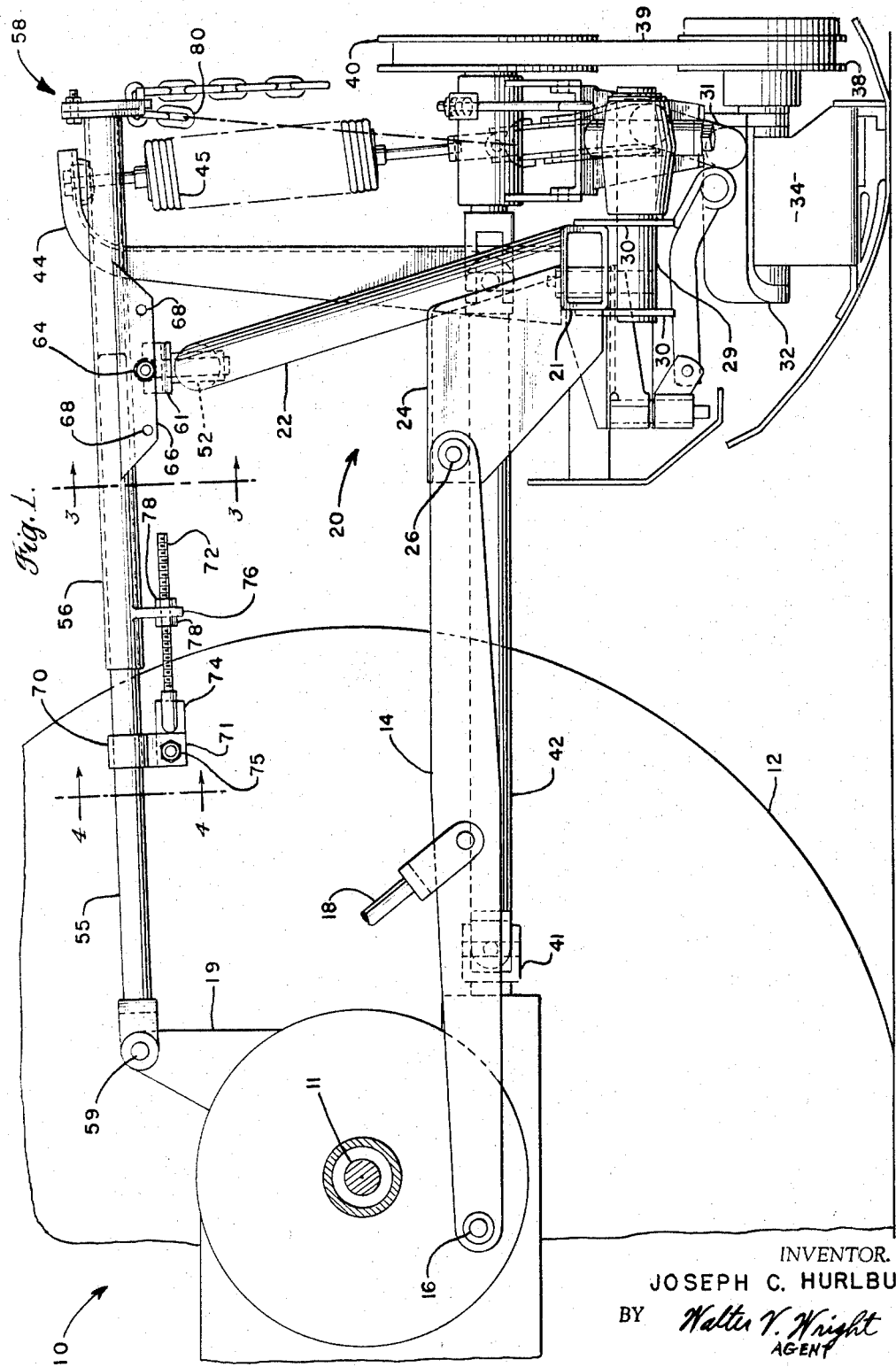
FIG. 1 is a fragmentary side elevational view of a tractor and three-point hitch mounted mower having an upper stabilizer arm constructed in accordance with the principles with the present invention.

Referring now to the drawings in detail, the reference numeral 10 in FIG. 1 indicates, generally, the rear portion of a farm tractor having a rear axle 11 and a pair of rear traction wheels 12 (one shown). Left and right laterally spaced drawbars 14 and 15 (see FIG. 2) have their forward ends pivotally mounted on the tractor body on a common horizontal transverse pivot axis 16. The drawbars normally extend rearwardly from pivot member 16 and are vertically swingable about the pivot member 16 under the control of the hydraulic system of the tractor acting through lift links 18 (one of which is partially shown in FIG. 1) as is well known in the art. A fixed upper rear hitch member 19 is carried by the tractor body above and substantially midway between the left and right drawbars 14 and 15.

A three-point hitch mower mounting frame is indicated, generally, by the reference numeral 20. Its major structural members are a horizontal transverse main frame beam 21 of box cross sectional configuration, an upstanding inverted U-shaped mast 22 carried by the main frame beam and a pair of gusset-like members 24 and 25 which project forwardly from the opposite ends of main frame beam 21 where the legs of the inverted U-shaped mast 22 joint the main frame beam. The beam 21, mast 22 and gusset-like members 24 and 25 are all welded or otherwise integrally connected into a rigid one piece unit. The gusset members 24 and 25, at their forwardmost ends, respectively, carry pivot members 26 and 28 which are received in mounting sockets carried by drawbars 14 and 15 near their rearmost ends, thereby pivotally mounting the mower base frame 20 on the drawbars 14 and 15.

A fore-and-aft extending pintle 29 is fixedly carried on the underside of main frame beam 21 by vertical plates 30. The usual drag bar 31 has one end pivotally mounted on pintle 29. The drag bar 31 normally extends downwardly and laterally from pintle 29 to a bifurcated free end 32. A mower driving head, of the pitmanless type, is indicated by the reference numeral 34. The mower driving head is carried by the bifurcated end of drag bar 31 for vertical pivotal movement about the axis of shaft 35 shown in FIG. 2. A conventional cutter bar 36 is carried by the mower driving head 34 and projects laterally therefrom. The mower driving head 34 receives its driving power from a pulley 38 journalled on shaft 35 and driven by a V-belt 39 from a main drive pulley 40 supported on the drag bar mounting assembly. The drive pulley 40 receives its driving power from the tractor power-take-off shaft 41 (FIG. 1) through an extension shaft 42 which extends rearwardly between the tractor power-take-off shaft and the shaft of drive pulley 40 and is connected to each by suitable universal joints.

A vertical stanchion 44 is carried by main frame beam 21 near the right side end of the beam. A rather heavy coil spring 45 has its upper end anchored on stanchion 44 and its lower end pivotally connected to a tapered four-cornered plate 46 which is pivotally mounted at 47 (FIG.

2) on a plate 48 which is fixedly mounted on and stands upwardly from drag bar 31. A link arm assembly 49 has one end pivotally connected at 50 to the plate 46 and the other end pivotally connected at 51 to the top of the mower driving head 34. The force of coil spring 45 acting upwardly on plate 46, relative to the pivot bolt 47, counterbalances the weight of the mower driving head and cutter bar 36, which acts through link arm 49 to urge plate 46 downwardly about pivot bolt 47. This arrangement enables the mower driving head and cutter bar to float along the ground in a relatively weightless condition.

In FIGS. 1–3 it will be apparent that a vertical hole extends through the upper most central part of U-shaped mast 22 a sleeve-like bushing 52 is carried in this hole and welded to mast 22 as may be seen at 54 in FIG. 3. This upper most central portion of mast 22 constitutes the third, or upper, hitch point of the mower mounting frame.

Referring primarily to FIG. 1, the upper stabilizer arm of the present invention comprises a first, or forward, member 55 and a second, or rearward, member 56. These members are coaxially disposed and extend rearwardly from the upper rear hitch member 19 of the tractor. The first member 55 is slidingly telescopically received within the second member 56. The second member 56 extends rearwardly beyond the mast 22 of the mower mounting frame and has a rear terminal end 58 disposed generally above the mower drag bar 31. The forwardmost end of first telescoping member 55 is spherically pivotally connected to the tractor upper rear hitch member 19 by a horizontal transverse pivot pin 59. Referring now primarily to FIG. 3 of the drawings, biaxial pivot means is employed to attach the second telescoping member 56 to the mast of the mower mounting frame. The biaxial pivot means has a vertical pivot member 60 which is received in the aforementioned bushing 52. Vertical member 60 has a fork-like reinforcing member 61 fixed thereto at its uppermost end. A horizontal bushing 62 is fixed to the upper end of vertical pivot member 60 and its fork-like reinforcing member 61. A horizontal mounting bolt 64 extends through bushing 62 and constitutes a horizontal pivot member of the biaxial pivot means. The vertical axis of pivot member 60 and the horizontal axis of pivot bolt 64 intersect each other at right angles. A pair of mounting plates 66 are fixedly carried by second telescoping member 56 and extend downwardly therefrom along opposite axial ends of the pivot bushing 62. The horizontal pivot bolt 64 extends through the mounting plates 66 thereby connecting the biaxial pivot device to the second of the telescoping members 56 of the upper stabilizer arm. In this manner the telescoping member 56 is connected to the mower base frame mast 22 for pivotal movement about both vertical and transverse horizontal axes. In FIG. 1 it may be seen that the pivot bolt 64 is shown projecting through the center hole of a series of three holes in plate 66 which are spaced apart along the axis of the second telescoping member 56. The bolt 64 may just as readily be inserted through the forwardly or rearwardly located holes 68 to provide a simple coarse adjustment of the length of cantilever of the upper stabilizer arm to compensate for tractors having different ranges of vertical drawbar swinging movement. It will be apparent from FIG. 1 that while the second of the telescoping members 56 is free to pivot either vertically or horizontally relative to the mower base frame, it is fixed against fore-and-aft movement relative to the mast 22, just as the first telescoping member 55 is fixed against fore-and-aft movement relative to the tractor 10 by the horizontal transverse pivot member 59.

In FIGS. 1 and 4 it may be seen that a pinch clamp member 70 encircles first telescoping member 55. The clamp member 70 has downwardly extended legs 71. An elongated threaded adjusting member 72 has one end fixedly carried by a plate 74 which is disposed between the legs 71 of pinch clamp 70. A nut and bolt, indicated collectively by the reference numeral 75, extends through both legs 71 of clamp 70 and through the plate 74 disposed therebetween. It will be apparent from FIG. 4 that by loosening or tightening the nut-bolt 75, the clamp member 70 may be expanded or contracted about the first telescoping member. When the clamp member 70 is expanded, it is freely slidable axially along member 55. When the bolt 75 is tightened, the clamp member 70 contracts about member 55 and locks itself in a fixed position relative to the first telescoping member 55.

As may be seen in FIG. 1, a lug 76 is welded, or otherwise fixedly provided, on second telescoping member 56. The lug 76 is provided with an aperture through which the elongated threaded adjusting member 72 extends. A pair of adjusting nuts 78 are carried by the adjusting member 72 and bear against opposite sides of the lug 76. Obviously, when the horizontal transverse pivot bolt 64 is inserted in the appropriate mounting holes 68 for the length and geometry of the particular tractor drawbars, the clamp member 70 may be fixedly clamped to member 55 in such a position along the axis of member 55 that the center portion of elongated threaded adjusting member 72 is received in lug 76. Then, by rotating the nuts 78 relative to member 72, the two telescoping members 55 and 56 may be extended or retracted relative to each other with precise accuracy to cause the entire mower mounting frame to tilt about the drawbar mounting pivots 26 and 28. This action effects a downward or upward tilting movement of the cutter bar 36 to economically accommodate different crop and field conditions. The slidably telescoping relation between members 55 and 56, along with the shiftable fine adjustment mechanism 70–78, provides a large overall range of stabilizer arm length adjustment, precise fine adjustment control and positive position locking means, with the manufacturing economy afforded by a minimum number and size of screw threads and threaded members.

In FIGS. 1 and 2, it may be seen that a chain 80, or the like, may be interconnected between the rear terminal end 58 of the second telescoping member 56 and the four-cornered plate 46 on the mower drag bar 31. In FIG. 1 it will be apparent that as the drawbars 14 and 15 are power driven upwardly about their pivotally mounted forward ends, the transverse horizontal pivot bolt 64 will be carried upwardly also while the forwardmost end of first telescoping member 55 remains fixed by pivot member 59. Thus, the stabilizer arm, in general, experiences a counterclockwise rotation about pivot bolt 64 relative to the mower base frame as the drawbars are raised. This carries the rear terminal end 58 of telescoping member 56 upwardly at a faster rate than the mower mounting frame thereby exerting tension on the chain 80 and causing an accelerated upward swinging movement of the cutter bar 36 and mower driving head 34 about the axis of shaft 35 along with an upward swinging motion of the entire drag bar 31 about its mounting pintle 29 in the absence of separate cutter bar gaging and drag bar lifting mechanism.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A stabilizer arm for use in mounting a mower on a tractor wherein the tractor has a pair of laterally spaced, rearwardly extending, vertically swingable drawbars and an upper rear hitch member disposed above and between said drawbars, and wherein said mower has a base frame having laterally spaced hitch members pivotally connectable, respectively, to said tractor drawbars, an upper hitch point disposed above and between said laterally spaced hitch members, and a laterally extending vertically swingable drag bar pivotally carried by said base frame at the rear thereof, said stabilizer arm extending rearwardly from said tractor upper rear hitch member to said mower base frame upper hitch point and comprising, first and second elongated coaxially disposed telescoping members, a pivot member connecting the forwardmost end of one of said telescoping members to said tractor upper rear hitch member, the other of said telescoping members extending rearwardly past said base frame upper hitch point and having a rear terminal end disposed generally above said drag bar, biaxial pivot means carried by said base frame at said upper hitch point and having a vertical pivot axis and a transverse horizontal pivot axis, means connecting said biaxial pivot means to said other of said telescoping members forwardly of its rear terminal end whereby said stabilizer arm is free to pivot both horizontally and vertically relative to said base frame while being fixed against fore-and-aft movement relative thereto, means innerconnecting said rear terminal end of said other telescoping member and said drag bar to pivotally raise and lower said drag bar in response to vertical pivotal movement of said stabilizer arm relative to said base frame, and manually operable means for extending and retracting said telescoping members relative to each other to effect fore-and-aft tilting adjustment of said base frame relative to said drawbars.

2. A stabilizer arm as recited in claim 1 wherein said biaxial pivot means comprises a vertical pivot member, a horizontal pivot member, and means fixedly connecting said vertical pivot member and said horizontal pivot member together with their axes intersecting at right angles, means mounting said vertical pivot member on said base frame in a fixed location for rotation about its own axis, and wherein said means connecting said biaxial pivot means to said other of said telescoping members comprises an elongated plate fixed to said other telescoping member and extending parallel to the axis of said other telescoping member, said plate having a plurality of spaced apart holes therethrough, said horizontal pivot member being selectively receivable in any one of said holes to adapt said stabilizer arm for use with different tractors.

3. A stabilizer arm as recited in calim 1 wherein said manually operable means for extending and retracting said telescoping members relative to each other comprises an expandable and contractable clamp extending around one of said telescoping members, means for expanding and contracting said clamp, said clamp being freely slidable along the axis of said one of said telescoping members when it is expanded and being locked in a fixed position on said one of said telescoping members when it is contracted, an elongated threaded adjusting member extending alongside and parallel to said stabilizer arm and having one end carried by said clamp, a lug fixed on said other of said telescoping members and engaging said elongated threaded adjusting member, and a pair of adjusting nuts carried by said elongated adjusting member and engaging opposite sides of said lug whereby selective rotation of said adjusting nuts relative to said elongated threaded member, when said clamp is contracted, operates through said lug to selectively extend and retract said telescoping member to effect tilting adjustment of said mower relative to said drawbars.

4. A stabilizer arm for use in mounting a mower on a tractor wherein the tractor has a pair of laterally spaced, rearwardly extending, vertically swingable drawbars and an upper rear hitch member disposed above and between said drawbars, and wherein said mower has a base frame having laterally spaced hitch members pivotally connected, respectively, to said tractor drawbars, an upstanding mast having an upper hitch point disposed above and between said laterally spaced hitch members, and a laterally extending vertically swingable drag bar pivotally mounted on said base frame behind said mast, said stabilizer arm extending rearwardly from said tractor upper rear hitch member to said mower upper hitch point to stabilize said mower in the fore-and-aft direction when said drawbars are swung vertically to raise and lower the mower and comprising, first and second elongated coaxially disposed telescoping members, said first member having a rear portion slidably received within the forward portion of said second member, a pivot member connecting the forwardmost end of said first telescoping member to said tractor upper rear hitch member, said second telescoping member extending rearwardly past said base frame upper hitch point and having a rear terminal end disposed generally above said drag bar, a generally T-shaped pivot means having a horizontal pivot member carried by said second telescoping member on the underside thereof forwardly of said rear terminal end with said horizontal pivot member extending transverse to the axis of said second telescoping member, said T-shaped pivot means having a vertical pivot member depending downwardly and carried by said base frame mast at said upper hitch point whereby said second telescoping member is free to pivot both horizontally and vertically relative to said base frame while being fixed against fore-and-aft movement relative thereto, means innerconnecting said rear terminal end of said second telescoping member and said drag bar to pivotally raise and lower said drag bar in response to pivotal movement of said second telescoping member about said horizontal pivot member of said T-shaped pivot means, an elongated threaded adjusting member extending alongside and parallel to said stabilizer arm, an adjustable clamp carrying one end of said elongated adjusting member on said first telescoping member for sliding movement axially thereon, means for locking said clamp in any desired position along the axis of said first telescoping member, lug means on said second telescoping member engaging said threaded adjusting member, and a second threaded member carried by said elongated adjusting member and engaging said lug means for extending and retracting said telescoping members in response to relative rotation between said threaded members when said clamp is locked relative to said first telescoping member to effect fore-and-aft tilting adjustment of said mower mounting frame relative to said drawbars.

References Cited
UNITED STATES PATENTS

| | | | |
|---|---|---|---|
| 2,673,437 | 3/1954 | Pollock et al. | 56—25 |
| 2,796,713 | 6/1957 | Richey | 56—25 |
| 3,086,345 | 4/1963 | Muehlhausen | 56—25 |
| 3,109,272 | 11/1963 | Hedtke | 56—25 |
| 3,133,397 | 5/1964 | Halls | 56—25 |

LUCIE H. LAUDENSLAGER, *Primary Examiner.*